United States Patent
Ghosh et al.

(10) Patent No.: US 9,514,502 B2
(45) Date of Patent: Dec. 6, 2016

(54) METHODS AND SYSTEMS FOR DETECTING SHOT BOUNDARIES FOR FINGERPRINT GENERATION OF A VIDEO

(71) Applicant: Interra Systems, Inc., Cupertino, CA (US)

(72) Inventors: Kushal Ghosh, Noida (IN); Rishi Gupta, Noida (IN)

(73) Assignee: Interra Systems Inc., Cupertino, CA (US)

(*) Notice: Subject to any disclaimer, the term of this patent is extended or adjusted under 35 U.S.C. 154(b) by 210 days.

(21) Appl. No.: 14/601,968

(22) Filed: Jan. 21, 2015

(65) Prior Publication Data
US 2016/0210716 A1   Jul. 21, 2016

(51) Int. Cl.
| | | |
|---|---|---|
| G06T 1/00 | (2006.01) | |
| G06K 9/46 | (2006.01) | |
| H04N 1/32 | (2006.01) | |
| G06K 9/00 | (2006.01) | |

(52) U.S. Cl.
CPC ......... *G06T 1/0021* (2013.01); *G06K 9/00744* (2013.01); *G06K 9/4642* (2013.01); *H04N 1/32277* (2013.01); *G06T 2201/0065* (2013.01)

(58) Field of Classification Search
CPC ............ G06K 9/00744; G06K 9/00751; G06K 9/00765; G06K 9/4642; G06K 9/4647
See application file for complete search history.

(56) References Cited

U.S. PATENT DOCUMENTS

| | | | | |
|---|---|---|---|---|
| 8,379,154 B2* | 2/2013 | Zhang | ................... | G11B 27/28 348/701 |
| 2002/0196974 A1* | 12/2002 | Qi | ...................... | G06K 9/00711 382/170 |
| 2009/0290791 A1* | 11/2009 | Holub | ................ | G06K 9/00234 382/164 |
| 2011/0026825 A1* | 2/2011 | Chaudhuri | ......... | G06K 9/00751 382/170 |
| 2013/0113999 A1* | 5/2013 | Vashistha | ............... | H04N 5/147 348/702 |
| 2014/0093164 A1* | 4/2014 | Noorkami | .......... | G06K 9/00744 382/165 |
| 2014/0099034 A1* | 4/2014 | Rafati | ................... | G06T 7/0028 382/209 |
| 2015/0086067 A1* | 3/2015 | Mehta | .................. | G06T 1/0071 382/100 |
| 2016/0070963 A1* | 3/2016 | Chakraborty | ........ | G06K 9/6271 386/241 |

* cited by examiner

*Primary Examiner* — Wesley Tucker
(74) *Attorney, Agent, or Firm* — Next ip Law Group

(57) ABSTRACT

The present invention relates to computation of digital fingerprint of a video sequence. The invention presents systems and methods for quick identification of shot boundaries and extraction of fingerprints by processing one or more specific frames. The systems and methods are applied on uncompressed video or compressed video having interframe or intra-frame compression. The methods comprises of comparing two frames of the video having a gap in between and identifying a specific frame present in between the two frames such that the specific frame may have a shot boundary. Shot boundaries are calculated for the entire video and then a fingerprint is generated using all the shot boundaries present in the video.

18 Claims, 6 Drawing Sheets

METHODS AND SYSTEMS FOR DETECTING SHOT BOUNDARIES FOR FINGERPRINT GENERATION OF A VIDEO

FIELD OF THE INVENTION

The present disclosure broadly relates to fingerprint generation of a video. More particularly the present disclosure relates to methods and systems for detecting shot boundary for generating fingerprint of a video.

BACKGROUND OF THE INVENTION

The increasing amount of digital media available on local storage devices and interconnected storage devices and networked servers gives rise to the need of managing such media by means of various technologies together referred to as Digital asset management (DAM). Digital asset management consists of management tasks and decisions surrounding the ingestion, annotation, cataloguing, storage, retrieval and distribution of digital assets. A sub-category of Digital asset management called Media Asset Management (MAM) deals with assets or contents such as digital photographs, animations, videos and music.

Tracking content across a Media Asset Management (MAM) workflow have become an integral part of workflow management to take decisions like determining the content that needs to undergo a quality verification, resizing the resolution from HD to SD for digital television, frame rate change as per NTSC or PAL standard, inserting advertisements between movies, removing unwanted shots/scenes, and the like. The digital content stored in terms of files are subjected to various kinds of operations for broadcasting to various regions and through various channels like digital television, web delivery, mobile etc. These operations are done in various workflow stages.

Due to the vast amount of information available, processes for identifying similar videos may be desirable. Given the large quantity of videos that may be made available on various web sites, it may be desirable for web site operators to be able to identify if one or more video files correspond to one or more other video files. Hence there is a need to develop a video fingerprinting technique through which media files can be linked after undergoing these transformations. Media files with similar fingerprints contain portions of same video.

A video fingerprint is a compact digital representation of a video that summarizes the unique characteristics of the video. The fingerprint data file of a video can be stored, retrieved and used to identify the original video whenever required. Video fingerprinting generates a unique digital profile and can be used to analyze and identify any video source such as TV, video repositories, other digital streams, and the like. A Video fingerprint is useful for tracking or searching similar content that may accessed for Media Asset Management. A video fingerprint may also be useful to identify copyright violation or copyright monetization in a system having user generated content. For example, in a system where a user can upload a video, video fingerprinting may be useful to identify situations where there has been a violation of a third party's copyright with the uploaded video. If a user has improperly incorporated a copyrighted work into uploaded video, a video fingerprint may help to identify the source of the copyrighted video, which may help in disabling access to user video that improperly incorporates the copyrighted video. In addition, video fingerprinting may be useful for detecting copyrighted works for other purposes, such as for tracking and distributing royalties for licensed works. In addition, video fingerprinting may be useful for identifying duplicate content. In this example, video files may, under some circumstances involve significant amounts of storage. At least in part by reducing duplicate content a system or process may be able to improve performance or cost by reducing the amount of storage for saved content. In addition, video fingerprinting may be useful in improving video search engine results, for example, such as by presenting more relevant searches earlier or by identifying alternate copies of video content. Furthermore, search results with similar video fingerprints may be grouped together for presentation to a searcher.

Video fingerprinting is based on the unique characteristics of the video and can be used to compare similar videos. Different versions of the same video may have different fingerprints and may be used to identify and classify different but related versions. Similar content for a given query is searched in a database storing a plurality of fingerprints. A digital video comprises of one or more shots. The fingerprint of a video is determined based on the shot transition frames present in a video that are in turn detected based on the shot boundaries present in a video. A technique known as Locality Sensitive Hashing (LSH) is applied on shots' duration and obtained buckets are stored in database for long duration videos like serials or movies.

Identifying the shots in video require frame by frame analysis of all the frames present in a video and fingerprint computed by this means is called regular fingerprint. Since shot identification is a time consuming process and may delay critical decisions with respect to a video, hence, there exists a need for a faster version of fingerprint extraction which tries to identify shots by identifying and analyzing only a few selected frames amongst a plurality of frames present in the video.

BRIEF SUMMARY OF THE INVENTION

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure provides methods, systems and computer program products for determining digital fingerprint of videos. The disclosure specifically presents techniques for quick identification of shot boundaries and extraction of fingerprints in lesser time by identifying and analyzing only a few selected frames amongst a plurality of frames present in the video. In a preferred aspect, the method is applied on long form content such as videos having duration of more than 5 minutes. However, a person skilled in the art may utilize or logically modify the method for videos of shorter duration as well. The method described is optimized depending on the type of encoding of the video. Primarily, the method is optimized for intra-frame encoded videos and inter-frame encoded videos. However, uncompressed videos may also be processed for determining the fingerprint.

The present disclosure also provides an approach to track similar content by extracting video fingerprints and comparing the same. Extraction of video fingerprints is done by identifying shot boundaries and identifying and analyzing a few selected frames amongst a plurality of frames present in the video. A fingerprint of a video comprises of Metadata, Shot signature, Frame signature, and Buckets. The Metadata comprises of video properties such as resolution, frame rate, chrominance value, and the like. The Shot signature comprises of data computed from the shots transition frames present in a video that are visually perceived when a shot changes. The Frame signature comprises of data computed out of few erroneous frames which could be due sudden flashiness, black frame etc. The buckets comprise of the way the above information is arranged/indexed for fast searching in a database.

In a first embodiment, a method for generating a fingerprint of a video having a plurality of inter-coded frames is described. The method comprises a plurality of processor implemented steps that may be executed in a sequence based on a number of factors relating to feasibility and need. The method is performed for a video having a plurality of frames that are in a linear temporal sequence. The inter-coded frames comprise of I-frames, P-frames and B-frames. A video containing inter-coded frames comprises of one or more group of pictures also referred to as a GOP which is a collection of successive frames starting with an I-frame. In a preferred aspect, the method includes decoding the I-frames and P-frames and the B-frames of the video are neither decoded nor processed. The method begins with decoding one or more I-frames present in a video, wherein the one or more I-frames comprise of a first I-frame and a second I-frame. Then, a group of pictures lengths is determined for a predefined number of group of pictures present in the video. Histogram of luminance values of the pixels is then calculated for the first I-frame and the second I-frame. Once the histograms have been calculated, a normalized histogram difference is calculated between the histogram of luminance values of the pixels of the first I-frame and histogram of luminance values of the pixels of the second I-frame. In an aspect, the histogram difference between the histogram of luminance values of the pixels of the first I-frame and histogram of luminance values of the pixels of the second I-frame is normalized over the frame size of the frames present in the video. The normalized histogram difference is then compared with a first predefined threshold.

In case, the normalized histogram difference is greater than or equal to the first predefined threshold, then the length of all the one or more group of pictures length are analyzed and if the lengths are of different sizes, then a shot boundary is determined for a predefined number of frames present at the end of the group of pictures comprising one or more P-frames and the second I-frame. In case, the shot boundary is detected then a frame having the shot boundary is set as a shot transition frame. Once, the shot transition frame is detected, a shot signature is determined based on the shot transition frame. The shot signature based on the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In another case, if all the one or more group of pictures lengths are of the same size, then a shot boundary is determined for each of the one or more group of pictures comprising the second I-frame and the P-frames present between first I-frame and second I-frame. In case, the shot boundary is detected then the frame having the shot boundary is set as a shot transition frame. Once, the shot transition frame is detected, a shot signature is determined based on the shot transition frame. The shot signature based on the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In another case, if a predefined number of group of pictures lengths are of same size and the remaining group of pictures lengths in the video are of different sizes, and also if the gap between the I-frames is more than a first predefined number of frames, then a shot boundary is determined for a predefined number of frames present at the end of the group of pictures comprising the P-frames and the second I-frame. If the shot boundary is detected, then a frame having shot boundary is set as a shot transition frame. Once, the shot transition frame is detected, a shot signature is determined based on the shot transition frame. The shot signature based on the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In yet another case, if a predefined number of group of pictures lengths are of same size and the remaining group of pictures lengths in the video are of different sizes, and also if the gap between the I-frames is less than or equal to the first predefined number of frames then a shot boundary is determined for each individual group of pictures comprising the second I-frame and the P-frames present between first I-frame and second I-frame. If the shot boundary is detected then the frame having shot boundary is set as a shot transition frame. Once, the shot transition frame is detected, a shot signature is determined based on the shot transition frame. The shot signature based on the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In another embodiment, a system for generating a fingerprint of a video having a plurality of inter-coded frames is provided. The system comprises of at least a decoder and a processor. The decoder is configured for decoding at least the I-frames and P-frames present in the video. The processor is communicatively coupled with the decoder for receiving I-frames and P-frames present in the video from the decoder. The processor is configured for determining a group of pictures lengths for a predetermined number of groups of pictures present in the video then the result of the same is approximated to the rest of the group of pictures. Histogram of luminance values of the pixels is then calculated for the first I-frame and the second I-frame. Once the histograms have been calculated, a normalized histogram difference is calculated between the histogram of luminance values of the pixels of the first I-frame and histogram of luminance values of the pixels of the second I-frame. In an aspect, the histogram difference between the histogram of luminance values of the pixels of the first I-frame and histogram of luminance values of the pixels of the second I-frame is normalized over the frame size of the frames present in the video. The normalized histogram difference is then compared with a first predefined threshold.

In case, the normalized histogram difference is greater than or equal to the first predefined threshold, then the lengths of all the one or more group of pictures length are analyzed and if the lengths are of different sizes, then a shot boundary is determined for a predefined number of frames present at the end of the group of pictures comprising one or more P-frames and the second I-frame. In case, the shot boundary is detected then a frame having the shot boundary is set as a shot transition frame. Once, the shot transition frame is detected, a shot signature is determined based on the shot transition frame. The shot signature of the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In another case, if all the one or more group of pictures lengths are of the same size, then a shot boundary is determined for each of the one or more group of pictures comprising the second I-frame and the P-frames present between first I-frame and second I-frame. In case, the shot boundary is detected then the frame having the shot boundary is set as a shot transition frame. Based on the shot transition frame, a shot signature is determined and then the same is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In another case, if a predefined number of group of pictures lengths are of same size and the remaining group of pictures lengths in the video are of different sizes, and also if the gap between the I-frames is more than a first predefined number of frames, then a shot boundary is determined for a predefined number of frames present at the end of the group of pictures comprising the P-frames and the second I-frame. If the shot boundary is detected, then a frame having shot boundary is set as a shot transition frame and a shot signature is determined based on the shot transition frame. The shot signature of the shot transition frame is then utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In yet another case, if a predefined number of group of pictures lengths are of same size and the remaining group of pictures lengths in the video are of different sizes, and also if the gap between the I-frames is less than or equal to the first predefined number of frames then a shot boundary is determined for each individual group of pictures comprising the second I-frame and the P-frames present between first I-frame and second I-frame. If the shot boundary is detected then the frame having shot boundary is set as a shot transition frame. A shot signature based on the shot transition frame is determined and then the shot signature of the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In an embodiment, a computer program product for generating a fingerprint of a video having a plurality of inter-coded frames is described. The computer program product comprises of a non-transitory computer-readable medium having instructions embodied thereon, which when executed by a processor causes the processor to implement a method. The method comprises the steps of decoding one or more I-frames present in a video, wherein the one or more I-frames comprise of a first I-frame and a second I-frame. Then, a group of pictures lengths is determined for a predefined number of group of pictures present in the video. Histogram of luminance values of the pixels is then calculated for the first I-frame and the second I-frame. Once the histograms have been calculated, a normalized histogram difference is calculated between the histogram of luminance values of the pixels of the first I-frame and histogram of luminance values of the pixels of the second I-frame. In an aspect, the histogram difference between the histogram of luminance values of the pixels of the first I-frame and histogram of luminance values of the pixels of the second I-frame is normalized over the frame size of the frames present in the video. The normalized histogram difference is then compared with a first predefined threshold.

In case, the normalized histogram difference is greater than or equal to the first predefined threshold, then the length of all the one or more group of pictures length are analyzed and if the lengths are of different sizes, then a shot boundary is determined for a predefined number of frames present at the end of the group of pictures comprising one or more P-frames and the second I-frame. In case, the shot boundary is detected then a frame having the shot boundary is set as a shot transition frame. Once, the shot transition frame is detected, a shot signature is determined based on the shot transition frame. The shot signature of the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated for determining all the shot boundaries present in the video, i.e. the method steps are repeated till the second I-frame is equal to last I-frame of the video.

In another case, if all the one or more group of pictures lengths are of the same size, then a shot boundary is determined for each of the one or more group of pictures comprising the second I-frame and the P-frames present between first I-frame and second I-frame. In case, the shot boundary is detected then the frame having the shot boundary is set as a shot transition frame. Based on the shot transition frame, a shot signature is determined and then the same is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In another case, if a predefined number of group of pictures lengths are of same size and the remaining group of pictures lengths in the video are of different sizes, and also if the gap between the I-frames is more than a first predefined number of frames, then a shot boundary is determined for a predefined number of frames present at the end of the group of pictures comprising the P-frames and the second I-frame. If the shot boundary is detected, then a frame having shot boundary is set as a shot transition frame and a shot signature is determined based on the shot transition frame. The shot signature of the shot transition frame is then utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In yet another case, if a predefined number of group of pictures lengths are of same size and the remaining group of pictures lengths in the video are of different sizes, and also if the gap between the I-frames is less than or equal to the first predefined number of frames then a shot boundary is determined for each individual group of pictures comprising the second I-frame and the P-frames present between first I-frame and second I-frame. If the shot boundary is detected then the frame having shot boundary is set as a shot transition frame. A shot signature based on the shot transition frame is determined and then the shot signature of the shot transition frame is utilized for determining the fingerprint of the video. After, a shot signature and shot transition frame is determined the first I-frame is set equal to the second I-frame and the second I-frame is set equal to a sequentially next I-frame present after the newly set first I-frame. All the steps of the method are then repeated till all the shot boundaries present in the video are determined i.e. the method steps are repeated till the second I-frame is equal to last I-frame of the video.

In a second embodiment, a method for generating a fingerprint of a video having a plurality of intra-coded frames is described. In an aspect, the method according to the second embodiment may also be applicable for videos having a plurality of uncompressed frames. The method comprises a plurality of processor implemented steps that may be executed in a sequence based on a number of factors relating to feasibility and need. The method is performed for a video having a plurality of frames that are in a temporal sequence. Each decoded frame comprises of a plurality of pixels. The method steps comprise of calculating a histogram of luminance values of pixels of a first frame and a histogram of luminance values of pixels of a second frame. The first frame and the second frame are in a sequential order and may have a gap of a first predefined number of frames in between. Then, a normalized histogram difference is calculated between the histogram of luminance values of the pixels of the first frame and histogram of luminance values of the pixels of the second frame. In an aspect, the histogram difference between the histogram of luminance values of the pixels of the first frame and histogram of luminance values of the pixels of the second frame is normalized over the frame size of the frames present in the video. Such a calculated normalized histogram difference is then compared with a first predefined threshold.

In case, the normalized histogram difference is greater than or equal to the first predefined threshold and the gap between the first frame and the second frame is lesser than a second predefined threshold, then steps are carried out to detect a shot boundary. If the shot boundary is found, then a frame having the shot boundary is set as a shot transition frame. Based on the shot transition frame, a shot signature is determined. The shot signature based on the shot transition frame is then finally used for determining the fingerprint of the video. Once a shot boundary is found in the video frames, the first frame is set equal to the shot transition frame and the second frame is set either equal to a frame present after the first predefined number of frames from the newly set first frame if the number of frames present between the newly set first frame and the last frame of the video is greater than the first predefined number of frames, or the second frame is set equal to the last frame of the video. Finally, all the steps of the method are repeated for determining all the shot boundaries present in the video, i.e. the method steps are repeated till the second frame is equal to last frame of the video.

In another case, if the normalized histogram difference is greater than or equal to the first predefined threshold and the gap between the first frame and the second frame is greater than or equal to the second predefined threshold, then a middle frame present in between the first frame and the second frame is determined. After the middle frame has been determined, a first normalized histogram difference between a histogram of luminance values of the pixels of the middle frame and the histogram of luminance values of the pixels of the first frame is determined. Similarly, a second normalized histogram difference between the histogram of luminance values of the pixels of the middle frame and the histogram of luminance values of the pixels of the second frame is determined. In an aspect, the normalized histogram difference is normalized over the frame size of the frames present in the video. The first normalized histogram difference is then compared with the second normalized histogram difference. In case, the first normalized histogram difference is greater than or equal to the second normalized histogram difference, then all the steps of the method are repeated for frames in between and including the first frame and the middle frame. In another case, if the first normalized histogram difference is lesser than the second normalized histogram difference, then all the steps of the method are repeated for frames present in between the middle frame and the second frame and including the middle frame and the second frame. Finally, all the steps of the method are repeated for determining all the shot boundaries present in the video, i.e. the method steps are repeated till the second frame is equal to last frame of the video.

In an embodiment, a computer program product for generating a fingerprint of a video having a plurality of intra-coded frames is described. The computer program product comprises of a non-transitory computer-readable medium having instructions embodied thereon, which when executed by a processor causes the processor to implement a method. The method steps comprise of calculating a histogram of luminance values of pixels of a first frame and a histogram of luminance values of pixels of a second frame. The first frame and the second frame are in a sequential order and may have a gap of a first predefined number of frames in between. Then, a normalized histogram difference is calculated between the histogram of luminance values of the pixels of the first frame and histogram of luminance values of the pixels of the second frame. In an aspect, the histogram difference between the histogram of luminance values of the pixels of the first frame and histogram of luminance values of the pixels of the second frame is normalized over the frame size of the frames present in the video. Such a calculated normalized histogram difference is then compared with a first predefined threshold.

In case, the normalized histogram difference is greater than or equal to the first predefined threshold and the gap between the first frame and the second frame is lesser than a second predefined threshold, then steps are carried out to detect a shot boundary. If the shot boundary is found, then a frame having the shot boundary is set as a shot transition frame. Based on the shot transition frame, a shot signature is determined. The shot signature based on the shot transition frame is then finally used for determining the fingerprint of the video. Once a shot boundary is found in the video frames, the first frame is set equal to the shot transition frame and the second frame is set either equal to a frame present after the first predefined number of frames from the newly set first frame if the number of frames present between the newly set first frame and the last frame of the video is greater than the first predefined number of frames, or the second frame is set equal to the last frame of the video. Finally, all the steps of the method are repeated for determining all the shot boundaries present in the video, i.e. the method steps are repeated till the second frame is equal to last frame of the video.

In another case, if the normalized histogram difference is greater than or equal to the first predefined threshold and the gap between the first frame and the second frame is greater than or equal to the second predefined threshold, then a middle frame present in between the first frame and the second frame is determined. After the middle frame has been determined, a first normalized histogram difference between a histogram of luminance values of the pixels of the middle frame and the histogram of luminance values of the pixels of the first frame is determined. Similarly, a second normalized histogram difference between the histogram of luminance values of the pixels of the middle frame and the histogram of luminance values of the pixels of the second frame is determined. In an aspect, the normalized histogram difference is normalized over the frame size of the frames present in the video. The first normalized histogram difference is then compared with the second normalized histogram difference. In case, the first normalized histogram difference is greater than or equal to the second normalized histogram difference, then all the steps of the method are repeated for frames in between and including the first frame and the middle frame. In another case, if the first normalized histogram difference is lesser than the second normalized histogram difference, then all the steps of the method are repeated for frames present in between the middle frame and the second frame and including the middle frame and the second frame. Finally, all the steps of the method are repeated for determining all the shot boundaries present in the video, i.e. the method steps are repeated till the second frame is equal to last frame of the video.

In another embodiment, a system for generating a fingerprint of a video having a plurality of intra-coded frames is provided. In an aspect, the system may also be configured for generating a fingerprint of an uncompressed video having a plurality of frames. The system comprises of at least a decoder and a processor. The decoder is configured for decoding frames present in the video having intra-coded frames. In an aspect, the decoder may be disabled when processing an uncompressed video. The processor is communicatively coupled with the decoder for receiving the decoded frames from the decoder. The processor is configured for calculating a histogram of luminance values of pixels of a first frame and a histogram of luminance values of pixels of a second frame. The first frame and the second frame are in a sequential order and may have a gap of a first predefined number of frames in between. Then, a normalized histogram difference is calculated between the histogram of luminance values of the pixels of the first frame and histogram of luminance values of the pixels of the second frame. In an aspect, the histogram difference between the histogram of luminance values of the pixels of the first frame and histogram of luminance values of the pixels of the second frame is normalized over the frame size of the frames present in the video. Such a calculated normalized histogram difference is then compared with a first predefined threshold.

In case, the normalized histogram difference is greater than or equal to the first predefined threshold and the gap between the first frame and the second frame is lesser than a second predefined threshold, then steps are carried out to detect a shot boundary. If the shot boundary is found, then a frame having the shot boundary is set as a shot transition frame. Based on the shot transition frame, a shot signature is determined. The shot signature based on the shot transition frame is then finally used for determining the fingerprint of the video. Once a shot boundary is found in the video frames, the first frame is set equal to the shot transition frame and the second frame is set either equal to a frame present after the first predefined number of frames from the newly set first frame if the number of frames present between the newly set first frame and the last frame of the video is greater than the first predefined number of frames, or the second frame is set equal to the last frame of the video. Finally, all the steps are repeated for determining all the shot boundaries present in the video, i.e. the steps are repeated till the second frame is equal to last frame of the video.

In another case, if the normalized histogram difference is greater than or equal to the first predefined threshold and the gap between the first frame and the second frame is greater than or equal to the second predefined threshold, then a middle frame present in between the first frame and the second frame is determined. After the middle frame has been determined, a first normalized histogram difference between a histogram of luminance values of the pixels of the middle frame and the histogram of luminance values of the pixels of the first frame is determined. Similarly, a second normalized histogram difference between the histogram of luminance values of the pixels of the middle frame and the histogram of luminance values of the pixels of the second frame is determined. In an aspect, the normalized histogram difference is normalized over the frame size of the frames present in the video. The first normalized histogram difference is then compared with the second normalized histogram difference. In case, the first normalized histogram difference is greater than or equal to the second normalized histogram difference, then all the steps are repeated for frames in between and including the first frame and the middle frame. In another case, if the first normalized histogram difference is lesser than the second normalized histogram difference, then all the steps are repeated for frames present in between the middle frame and the second frame and including the middle frame and the second frame. Finally, all the steps are repeated for determining all the shot boundaries present in the video, i.e. the steps are repeated till the second frame is equal to last frame of the video.

Further objects, advantages and novel features of the present invention are apparent from the following detailed description when read in conjunction with the appended claims and attached drawing.

BRIEF DESCRIPTION OF THE DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
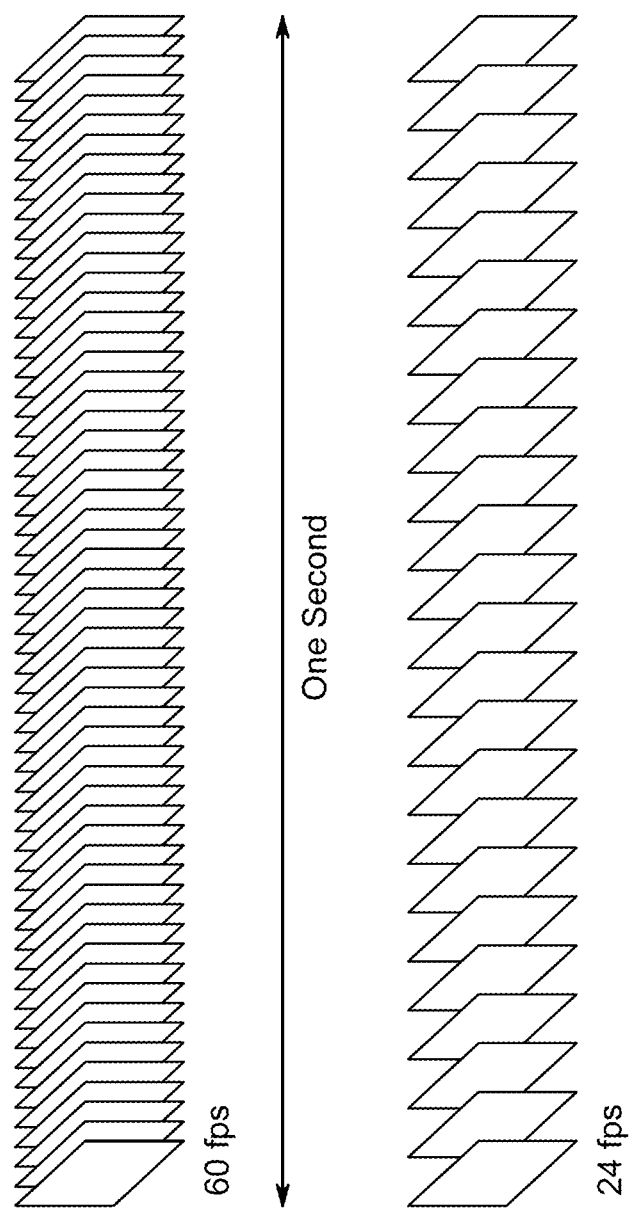
FIG. 1 illustrates exemplary videos having a plurality of frames.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Unless specifically stated otherwise, as apparent from the following discussion, it is appreciated that throughout this specification discussions utilizing terms such as "processing," "computing," "calculating," "selecting," "forming," "enabling," "extracting," "inhibiting," "identifying," "comparing," "representing," "modifying," "receiving," "transmitting," "storing," "authenticating," "authorizing," "determining," "slicing," "hashing," "generating" or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

FIG. 1 illustrates exemplary videos having a plurality of frames with certain frame rates. A video comprises of a plurality of frames, specifically an intra coded video has a plurality of compressed frames that are encoded based on the information contained within an individual frame and the compression is not relative to any other frame in the video sequence. In other words, no temporal processing is performed outside of the current frame. An uncompressed video on the other hand has a plurality of uncompressed frames. The figure shows a first video and a second video of duration of one Second. The first video has a frame rate of 60 fps i.e. 60 frames per second and the second video has a frame rate of 24 fps i.e. 24 frames per second.

Figure 2:
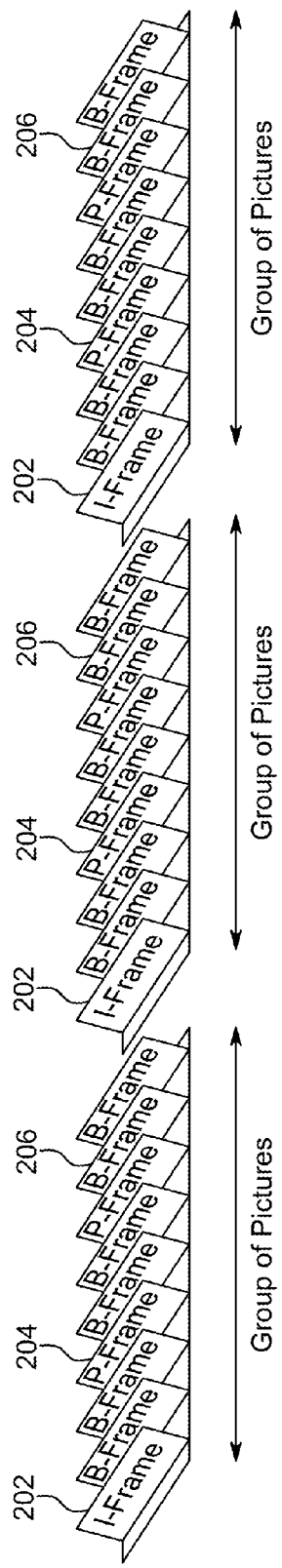
FIG. 2 illustrates a video having inter-coded frames with various types of frames.

FIG. 2 illustrates a video having inter-coded frames having various types of frames. The frames of the inter-coded video utilize temporal redundancy between neighboring frames thereby achieving a higher compression rate. The inter-coded video illustrated in FIG. 2 describes three types of frames, namely, an I-frame (202), a P-frame (204), and a B-frame (206). An inter-coded video sequence begins with an I-frame and contains one or more P-frames and B-frames in between two I-frames. An I-frame is also referred to as a key frame and such a frame contains all the information required to decode itself. An I-frame does not require information from any other frame of the video sequence. A P-frame stands for forward predicted pictures. The prediction is made from an earlier picture, mainly an I-frame, therefore a P-frame requires lesser coding data in comparison to an I-frame. The data needed for such a prediction consist of motion vectors and transform coefficients describing prediction correction. A B-frame stands for bi-directionally predicted pictures. This kind of prediction method occupies less coding data than P-frames as they can be predicted or interpolated from an earlier and/or later frame such as an I-frame or a P-frame. Similar to P-frames, B-frames are expressed as motion vectors and transform coefficients. An inter-coded video sequence comprises of a sequence starting with an I-frame with one or more P-frames and B-frames following the I-frame (202). Such a sequence structure is known as a group of pictures also referred to as a GOP. A video containing inter-coded frames comprises of one or more group of pictures which is a collection of successive frames starting with an I-frame.

Figure 3:
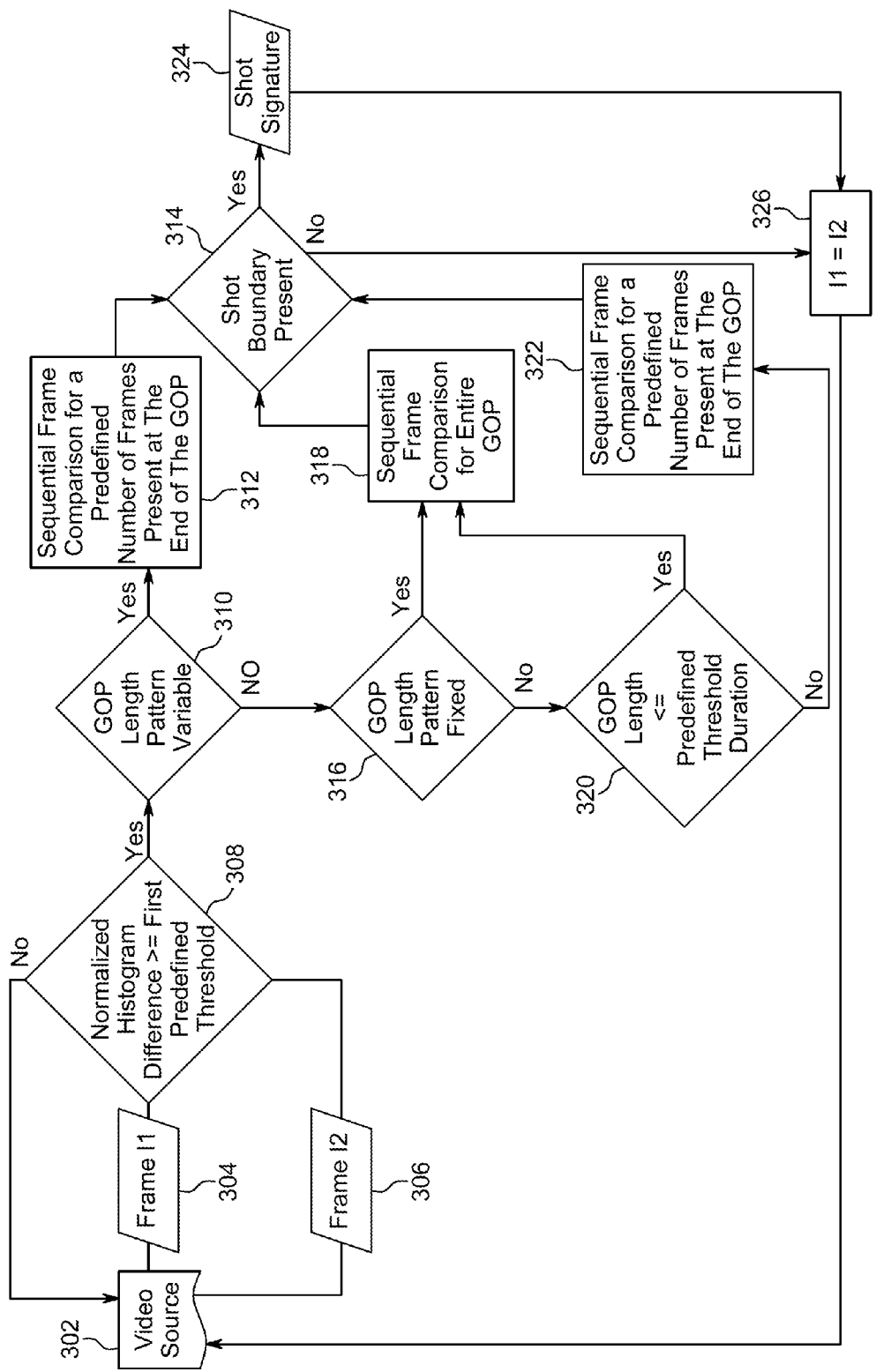
FIG. 3 illustrates a method for generating a fingerprint of a video having a plurality of inter-coded frames, according to an embodiment.

FIG. 3 illustrates a method for generating a fingerprint of a video having a plurality of inter-coded frames, according to an embodiment. The video is provided by a video source (302). The video has a plurality of frames that are in a linear sequence. In a preferred aspect, the method includes decoding the I-frames and P-frames and the B-frames of the video are neither decoded nor processed. The method begins with decoding a first I-frame (304) and a second I-frame (306). Lengths of the various group of pictures are then determined for a predefined number of group of pictures present in the video. For example, lengths of the first ten GOPs may be calculated based on which the lengths of the rest of the GOPs present in the video may be approximated.

Histogram of luminance values of the pixels is calculated for the first I-frame (304) and the second I-frame (306). At step (308), a normalized histogram difference is calculated between the histogram of luminance values of the pixels of the first I-frame (304) and histogram of luminance values of the pixels of the second I-frame (306). In an aspect, the histogram difference between the histogram of luminance values of the pixels of the first frame and histogram of luminance values of the pixels of the second frame is normalized over the frame size of the frames present in the video. Such a normalized histogram difference is then compared with a first predefined threshold. For example, the first predefined threshold may be 0.25, however, the value of the first predefined threshold may be programmed according to the need of a particular user.

In a case, if the normalized histogram difference is lesser than the first predefined threshold then the first I-frame is set equal to the second I-frame and the second I-frame is set to an I-frame present sequentially after the newly set first I-frame.

In case, the normalized histogram difference is greater than or equal to the first predefined threshold, then the length of all the one or more group of pictures length are analyzed at step (310) and if the lengths are of different sizes, then at step (312) a shot boundary is determined for a predefined number of frames present at the end of the group of pictures comprising one or more P-frames and the second I-frame. For example, last 5 percent of the frames present at the end of the group of pictures comprising only the P-frames and the second I-frame are sequentially analyzed. In a preferred aspect, the B-frames present in the video are neither decoded nor analyzed which in turn reduces the time required for determining shot boundary.

At step (314), if the shot boundary is detected then a frame having the shot boundary is set as a shot transition frame. Then at step (324), a shot signature is determined based on the shot transition frame. The shot signature of the shot transition frame is utilized for determining the fingerprint of the video as described in FIG. 5.

After a shot signature and shot transition frame is determined, then at step (326) the first I-frame (304) is set equal to the second I-frame (306) and the second I-frame (306) is set equal to a sequentially next I-frame present after the newly set first I-frame. All the steps of the method are then repeated for determining all the shot boundaries present in the video, i.e. the method steps are repeated till the second I-frame (306) is equal to last I-frame of the video.

In another case, if all the one or more group of pictures lengths are of the same size at step (316), then at step (318) a shot boundary is determined for each of the one or more group of pictures comprising the first I-frame (304) and second I-frame (306) and the P-frames present between first I-frame (304) and second I-frame (306).

At step (314), if the shot boundary is detected then a frame having the shot boundary is set as a shot transition frame. Then at step (324), a shot signature is determined based on the shot transition frame. The shot signature of the shot transition frame is utilized for determining the fingerprint of the video as described in FIG. 5.

After a shot signature and shot transition frame is determined, then at step (326) the first I-frame (304) is set equal to the second I-frame (306) and the second I-frame (306) is set equal to a sequentially next I-frame present after the newly set first I-frame. All the steps of the method are then repeated for determining all the shot boundaries present in the video, i.e. the method steps are repeated till the second I-frame (306) is equal to last I-frame of the video.

In another case, if at step (320), a predefined number of group of pictures lengths are of same size and the remaining group of pictures lengths in the video are of different sizes, and also if the duration of the GOP is less than or equal to a predefined threshold duration, then at step (318) a shot boundary is determined for all the frames present in the group of pictures. Otherwise step (322) is executed and shot boundary is determined for a predefined number of frames present at the end of the group of pictures comprising the P-frames and the second I-frame.

At step (314), if the shot boundary is detected then a frame having the shot boundary is set as a shot transition frame. Then at step (324), a shot signature is determined based on the shot transition frame. The shot signature of the shot transition frame is utilized for determining the fingerprint of the video as described in FIG. 5.

After a shot signature and shot transition frame is determined, then at step (326) the first I-frame (304) is set equal to the second I-frame (306) and the second I-frame (306) is set equal to a sequentially next I-frame present after the newly set first I-frame. All the steps of the method are then repeated for determining all the shot boundaries present in the video, i.e. the method steps are repeated till the second I-frame (306) is equal to last I-frame of the video.

The method of detecting the shot boundary comprises of determining a histogram of luminance values of pixels of a current frame, histogram of luminance values of pixels of a frame previous to the current frame. The current frame is determined based on sequentially traversing frames starting from P-frame present a predefined number of frames before the second I-frame (306) and including the second I-frame. Then a normalized histogram difference is determined, wherein the normalized histogram difference is equal to the difference between the histogram of luminance values of pixels of the current frame and the histogram of luminance values of pixels of a previous frame. The normalized histogram difference is compared with a third predefined threshold, and if the normalized histogram difference is greater than the third predefined threshold, then a minimum block-wise sum of absolute difference is calculated. The block-wise sum of absolute difference is calculated between the pixels of one or more blocks of the current frame and the pixels of one or more blocks of the previous frame within the neighborhood. Finally, a normalized summation of minimum block-wise sum of absolute difference is calculated for the current frame and comparing the normalized summation of minimum block-wise sum of absolute difference with a fourth predefined threshold, and if the normalized summation of minimum block-wise sum of absolute difference is greater than the fourth predefined threshold, then the shot boundary is detected at current frame.

Figure 4:
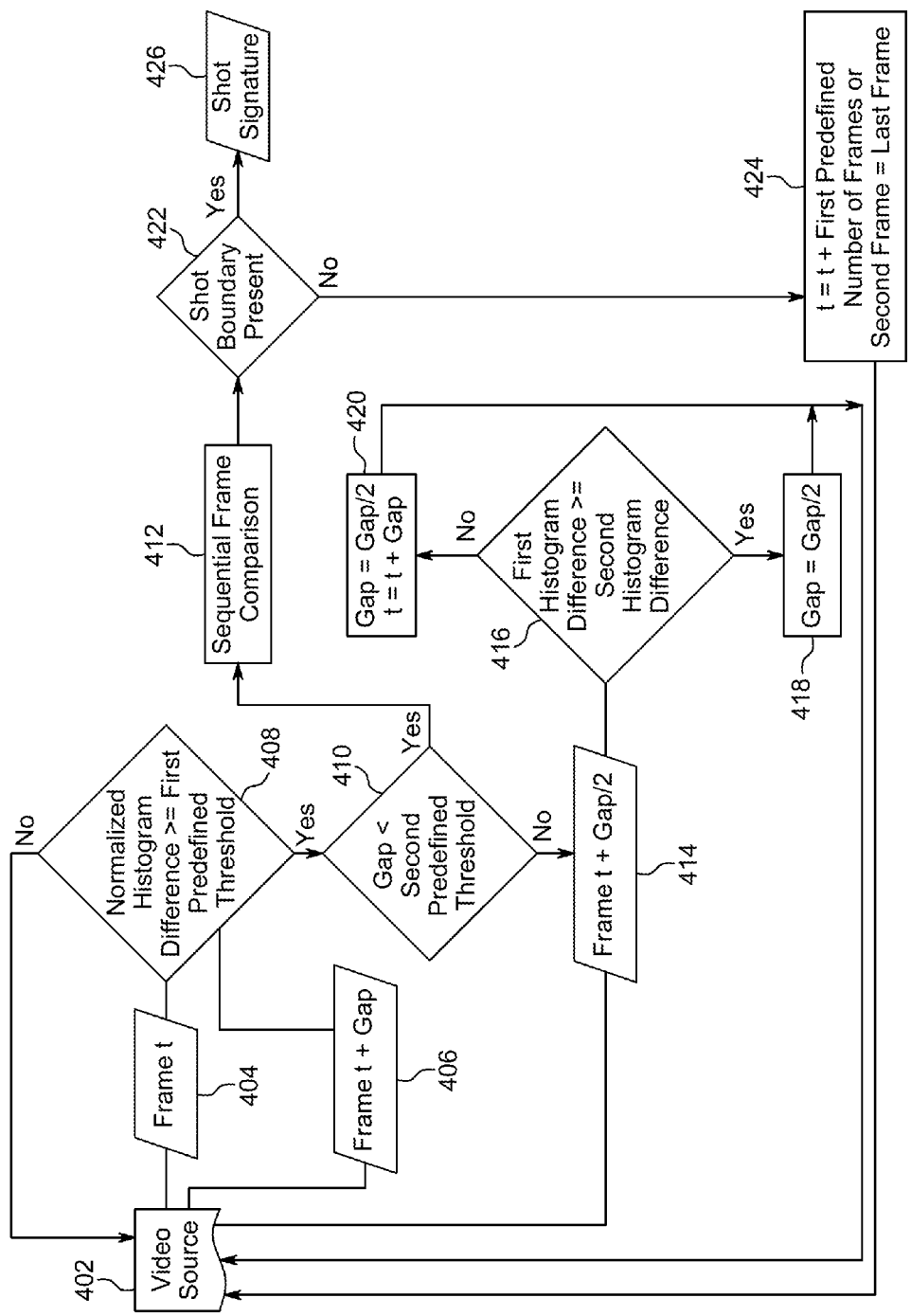
FIG. 4 illustrates a method for generating a fingerprint of a video having a plurality of intra-coded or uncompressed frames, according to an embodiment.

FIG. 4 illustrates a method for generating a fingerprint of a video having a plurality of intra-coded or uncompressed frames, according to an embodiment. The method comprises a plurality of processor implemented steps that may be executed in a sequence based on a number of factors relating to feasibility and need. The method is performed for a video having a plurality of frames that are in a temporal sequence. The frames of an intra-coded video are compressed or encoded based on an encoding technique. The frames of an uncompressed video are uncompressed. Each frame comprises of a plurality of pixels with each pixel having a luminance value and at least one chrominance value.

The video is initially retrieved from a video source (402) such as a database, camera, and the like. The video has a plurality of frames that are in a temporal sequence. The method begins with retrieving a first frame (404) and a second frame (406). The first frame (404) and the second frame (406) are in a temporal sequential order and may have a gap of a first predefined number of frames in between. In an aspect, the frames of an intra-coded video are first decoded and then further processed.

Histogram of luminance values of the pixels is calculated for the first frame (404) and the second frame (406). At step (408), a normalized histogram difference is calculated between the histogram of luminance values of the pixels of the first frame (404) and histogram of luminance values of the pixels of the second frame (406) and then compared with a first predefined threshold. In an aspect, the histogram difference between the histogram of luminance values of the pixels of the first frame and histogram of luminance values of the pixels of the second frame is normalized over the frame size of the frames present in the video. In an aspect, the first predefined threshold may be programmed according to the need of a particular user. At step (408), if the normalized histogram difference is less than the first predefined threshold then the first frame is set equal to the second frame and then the second frame is set either equal to a frame present after the first predefined number of frames from the newly set first frame if the number of frames present between the newly set first frame and the last frame of the video is greater than the first predefined number of frames, or the second frame is set equal to the last frame of the video. All the steps of the method are then repeated for determining all the shot boundaries present in the video, i.e. the method steps are repeated till the second frame (406) is equal to the last frame of the video.

In case, at step (408), if the normalized histogram difference is greater than or equal to the first predefined threshold, then at step (410) the gap between the first frame and the second frame is determined and compared with a second predefined threshold. If the gap between the first frame and the second frame is lesser than the second predefined threshold, then at step (412) a shot boundary is detected by sequentially comparing the frames starting from the first frame till the second frame.

At step (422), if the shot boundary is found, then a frame having the shot boundary is set as a shot transition frame. Based on the shot transition frame, a shot signature is determined at step (426). The shot signature of the shot transition frame is then used for determining the fingerprint of the video. In case, at step (422) if the shot boundary is not found, then step (424) is executed where the first frame is set equal to the second frame and the second frame is set either equal to a frame present after the first predefined number of frames from the newly set first frame if the number of frames present between the newly set first frame and the last frame of the video is greater than the first predefined number of frames, or the second frame is set equal to the last frame of the video. Finally, all the steps of the method are repeated till all the shot boundaries present in the video are determined, all the shot boundaries are determined by repeating all the method steps till the second frame is equal to the last frame of the video.

In another case, if at step (408), the normalized histogram difference is greater than or equal to the first predefined threshold and at step (410), the gap between the first frame and the second frame is greater than or equal to the second predefined threshold, then at step (414), a middle frame present sequentially in between the first frame and the second frame is determined.

At step (416), a first normalized histogram difference between a histogram of luminance values of the pixels of the middle frame and the histogram of luminance values of the pixels of the first frame is determined. Similarly, a second normalized histogram difference between the histogram of luminance values of the pixels of the middle frame and the histogram of luminance values of the pixels of the second frame is determined. In an aspect, the histogram difference is normalized over the frame size of the frames present in the video. The first normalized histogram difference is then compared with the second normalized histogram difference. If the first normalized histogram difference is greater than or equal to the second normalized histogram difference, then all the steps of the method are repeated for frames in between and including the first frame and the middle frame. Otherwise, if the first normalized histogram difference is lesser than the second normalized histogram difference, then all the steps of the method are repeated for frames present in between the middle frame and the second frame and including the middle frame and the second frame.

The method of detecting the shot boundary comprise of determining histogram of luminance values of pixels of a current frame and histogram of luminance values of pixels of a frame sequentially previous to the current frame. The current frame is determined based on sequentially traversing frames from the first frame till the second frame. A normalized histogram difference is then determined between the histogram of luminance values of the pixels of the current frame and the histogram of luminance values of pixels of a previous frame. The normalized histogram difference is compared with a third predefined threshold, and if the normalized histogram difference is greater than the third predefined threshold, then a minimum block-wise sum of absolute difference is calculated. The block-wise sum of absolute difference is calculated between the pixels of one or more blocks of the current frame and the pixels of one or more blocks of the previous frame within the neighborhood. Upon calculating the block-wise sum of absolute difference, a normalized summation of minimum block-wise sum of absolute difference is calculated for the current frame. The normalized summation of minimum block-wise sum of absolute difference is compared with a fourth predefined threshold, and if the normalized summation of minimum block-wise sum of absolute difference is greater than the fourth predefined threshold, then the shot boundary is detected at the current frame.

Figure 5:
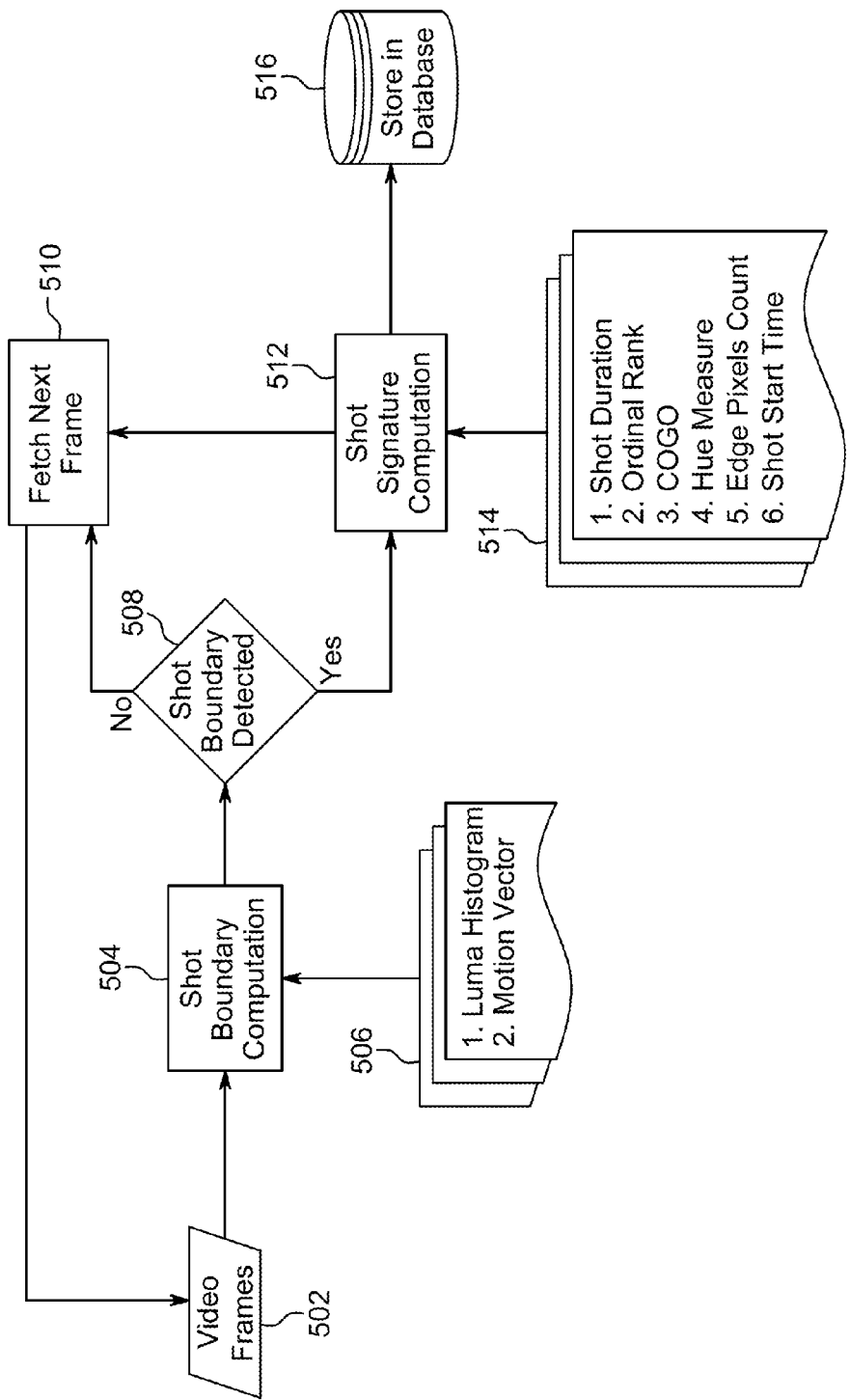
FIG. 5 illustrates a method for generating and storing a fingerprint of a video.

FIG. 5 illustrates a method of generating and storing a fingerprint of a video. For generating a fingerprint of a video, firstly at step (502) the video frames are retrieved. The video frames as described above may be inter-coded, or intra-coded, or uncompressed. Then at step (504), the shot boundary is computed by means of the methods described in FIG. 3 and FIG. 4. At step (506), the shot boundary detection takes into consideration the luminance values of the frames and the motion vector. At step (508), if the shot boundary is not detected then a next first frame and a next second frame is fetched as described above. At step (512), the shot signature is calculated if a shot boundary is detected at step (508). For intra coded frames as well as the inter coded frames the step of determining the shot signature (514) comprises of determining ordinal ranks, centroid of gradients' orientations, number of edge pixels, hue values of predefined regions of the shot transition frame, shot duration, and shot start time. The fingerprint of the video comprises of a metadata of the video, a list of shot signatures, and one or more buckets generated to hash one or more shots in a database.

The video fingerprints may then be stored in a database (516) or indexed for future use, such as in matching one or more videos corresponding to the video fingerprints. As used herein, a "video fingerprint" or "video signature" may refer to one or more extracted features from a video file or video cube that, under some circumstances, may be used to identify a video file. The fingerprints in the database (516) are indexed based on the buckets. The buckets are generated by means of Locality Sensitive Hashing (LSH) and are stored as shot hashes. The buckets generated for features of key frames through Locality Sensitive Hashing are stored in the database (516). While matching the shot signature is read corresponding to queried video and the video duration is found out. The method steps of Fingerprint matching comprise of searching for potential candidates in database through buckets of shot signature for identifying one or more candidates and then comparing the candidates and the query for further filtering. If the queried video has n shots (or n-9 shot groups), buckets generated through Locality Sensitive Hashing for each of its shot group is read from the database. Then all other shot groups are retrieved for each of the shot group of the queried video provided the buckets of the queried video match with corresponding buckets of retrieved candidates.

Figure 6:
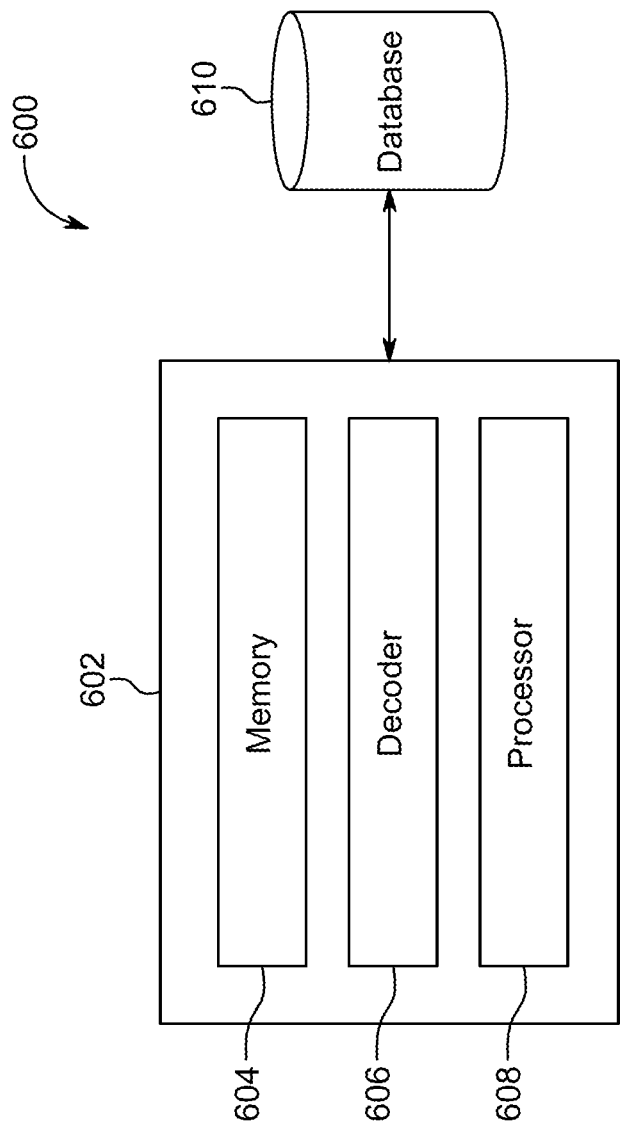
FIG. 6 illustrates a system for generating and storing a fingerprint of a video.

FIG. 6 illustrates a system for generating and storing a fingerprint of a video. The system (600) comprises of a system (602) that is configured for generating fingerprint of videos, and a database (610) that is communicatively coupled with the system (602) and is configured for storing and indexing the fingerprints of a plurality of videos. The system (602) comprises of a memory (604), a decoder (606), and a processor (608) that are communicatively coupled with each other. The memory (604) may be configured for storing one or more videos or video frames for which a fingerprint is to be generated. The memory (604) may also be configured for storing one or more hashes that are required for generating a fingerprint. The decoder (606) may be configured for decoding one or more I-frames and P-frames in an inter-coded video. The decoder (606) may be disabled in case of fingerprint generation of an uncompressed video. The processor (608) is configured for executing the method steps as described above. The processor (608) executes the method steps for an intra-coded video if the input received from memory (604) is an intra-coded video or an uncompressed video. The processor (608) executes the method steps for an inter-coded video if the input received from memory (604) is an inter-coded video. Once, system (602) has generated a fingerprint of a video, the database (610) stores the fingerprint and indexes the same for fingerprint searching and matching.

The terms video fingerprint and video signature may be used interchangeably throughout this document. In an embodiment, a video fingerprint may comprise a representation of one or more features extracted from a video file. The extracted features may comprise color and luminance, for example. It should, however, be noted that this is merely an example relating to extracted features and that claimed subject matter is not limited to this example.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for generating a fingerprint of a video having a plurality of frames, the method comprising the processor implemented steps of:
   calculating a histogram of luminance values of pixels of a first frame and a histogram of luminance values of pixels of a second frame, wherein the first frame and the second frame are in a sequential order and have a gap of a first predefined number of frames in between;
   calculating a normalized histogram difference between the histogram of luminance values of the pixels of the first frame and histogram of luminance values of the pixels of the second frame;
   comparing the normalized histogram difference with a first predefined threshold, and
      if the normalized histogram difference is greater than or equal to the first predefined threshold and the gap between the first frame and the second frame is lesser than a second predefined threshold, then
         detecting a shot boundary, and
            if the shot boundary is detected, then
               setting a frame having shot boundary as a shot transition frame;
               determining a shot signature based on the shot transition frame;
               utilizing the shot signature of the shot transition frame for determining the fingerprint of the video;
               setting the first frame equal to the shot transition frame and setting the second frame either equal to a frame present after the first predefined number of frames from the first frame or if the first predefined number of frames is greater than the number of frames between the first frame and the last frame of the video then setting the second frame equal to the last frame of the video; and
               repeating all the steps of the method till the second frame is equal to the last frame of the video;
      else if the normalized histogram difference is greater than or equal to the first predefined threshold and the gap between the first frame and the second frame is greater than or equal to the second predefined threshold, then
         determining a middle frame present sequentially in between the first frame and the second frame;
         determining a first normalized histogram difference between a histogram of luminance values of the pixels of the middle frame and the histogram of luminance values of the pixels of the first frame;
         determining a second normalized histogram difference between the histogram of luminance values of the pixels of the middle frame and the histogram of luminance values of the pixels of the second frame;
         comparing the first normalized histogram difference with the second normalized histogram difference and
         if the first normalized histogram difference is greater than or equal to the second normalized histogram difference, then
            repeating all the steps of the method for frames in between and including the first frame and the middle frame;
         else if the first normalized histogram difference is lesser than the second normalized histogram difference, then
            repeating all the steps of the method for frames in between and including the middle frame and the second frame.

2. The method as claimed in claim 1, wherein the video is either an uncompressed video or an intra coded video.

3. The method as claimed in claim 1, wherein the step of comparing the normalized histogram difference with the first predefined threshold further comprises if the normalized histogram difference is lesser than the first predefined threshold, then
   setting the first frame equal to the second frame and then setting the second frame either equal to a frame present after the first predefined number of frames from the first frame or if the first predefined number of frames is greater than the number of frames between the first frame and the last frame of the video then setting the second frame equal to the last frame of the video; and
   repeating all the steps of the method till the second frame is equal to the last frame of the video.

4. The method as claimed in claim 1, wherein the step of detecting a shot boundary further comprises if the shot boundary is not detected, then
   setting the first frame equal to the second frame and then setting the second frame either equal to a frame present after the first predefined number of frames from the first frame or if the first predefined number of frames is greater than the number of frames between the first frame and the last frame of the video then setting the second frame equal to the last frame of the video; and
   repeating all the steps of the method till the second frame is equal to the last frame of the video.

5. The method as claimed in claim 1, wherein the step of detecting the shot boundary comprises of
   determining histogram of luminance values of pixels of a current frame and histogram of luminance values of pixels of a frame sequentially previous to the current frame, wherein the current frame is determined based on sequentially traversing frames from the first frame till the second frame;
   determining a normalized histogram difference between the histogram of luminance values of the pixels of the current frame and the histogram of luminance values of pixels of a previous frame;
   comparing the normalized histogram difference with a third predefined threshold, and
   if the normalized histogram difference is greater than the third predefined threshold, then
      calculating a minimum block-wise sum of absolute difference, wherein the block-wise sum of absolute difference is calculated between the pixels of one or more blocks of the current frame and the pixels of one or more blocks of the previous frame within the neighborhood; and
      calculating a normalized summation of minimum block-wise sum of absolute difference for the current frame and comparing the normalized summation of minimum block-wise sum of absolute difference with a fourth predefined threshold, and if the normalized summation of minimum block-wise sum of absolute difference is greater than the fourth predefined threshold, then the shot boundary is detected at current frame.

6. The method as claimed in claim 1, wherein the step of determining the shot signature comprises of determining ordinal ranks, centroid of gradients' orientations, number of edge pixels, hue values of predefined regions of the shot transition frame, shot duration, and shot start time.

7. The method as claimed in claim 1, wherein the fingerprint of the video comprises of a metadata of the video, a list of shot signatures, and one or more buckets generated to hash one or more shots in a database.

8. A computer program product for generating a fingerprint of a video having a plurality of frames, the computer program product comprising a non-transitory computer-readable medium having instructions embodied thereon, which when executed by a processor causes the processor to implement a method, the method comprising:
calculating a histogram of luminance values of pixels of a first frame and a histogram of luminance values of pixels of a second frame, wherein the first frame and the second frame are in a sequential order and have a gap of a first predefined number of frames in between;
calculating a normalized histogram difference between the histogram of luminance values of the pixels of the first frame and histogram of luminance values of the pixels of the second frame;
comparing the normalized histogram difference with a first predefined threshold, and
if the normalized histogram difference is greater than or equal to the first predefined threshold and the gap between the first frame and the second frame is lesser than a second predefined threshold, then
detecting a shot boundary, and
if the shot boundary is detected, then
setting a frame having shot boundary as a shot transition frame;
determining a shot signature based on the shot transition frame;
utilizing the shot signature of the shot transition frame for determining the fingerprint of the video;
setting the first frame equal to the shot transition frame and setting the second frame either equal to a frame present after the first predefined number of frames from the first frame or if the first predefined number of frames is greater than the number of frames between the first frame and the last frame of the video then setting the second frame equal to the last frame of the video; and
repeating all the steps of the method till the second frame is equal to the last frame of the video;
else if the normalized histogram difference is greater than or equal to the first predefined threshold and the gap between the first frame and the second frame is greater than or equal to the second predefined threshold, then
determining a middle frame present sequentially in between the first frame and the second frame;
determining a first normalized histogram difference between a histogram of luminance values of the pixels of the middle frame and the histogram of luminance values of the pixels of the first frame;
determining a second normalized histogram difference between the histogram of luminance values of the pixels of the middle frame and the histogram of luminance values of the pixels of the second frame;
comparing the first normalized histogram difference with the second normalized histogram difference and
if the first normalized histogram difference is greater than or equal to the second normalized histogram difference, then
repeating all the steps of the method for frames in between and including the first frame and the middle frame;
else if the first normalized histogram difference is lesser than the second normalized histogram difference, then
repeating all the steps of the method for frames in between and including the middle frame and the second frame.

9. The computer program product as claimed in claim 8, wherein the video is either an uncompressed video or an intra coded video.

10. A system for a generating fingerprint of a video having a plurality of frames, the system comprising:
a processor communicatively coupled with a device for receiving the video frames and configured for:
calculating a histogram of luminance values of pixels of a first frame and a histogram of luminance values of pixels of a second frame, wherein the first frame and the second frame are in a sequential order and have a gap of a first predefined number of frames in between;
calculating a normalized histogram difference between the histogram of luminance values of the pixels of the first frame and histogram of luminance values of the pixels of the second frame;
comparing the normalized histogram difference with a first predefined threshold, and
if the normalized histogram difference is greater than or equal to the first predefined threshold and the gap between the first frame and the second frame is lesser than a second predefined threshold, then
detecting a shot boundary, and
if the shot boundary is detected, then
setting a frame having shot boundary as a shot transition frame;
determining a shot signature based on the shot transition frame;
utilizing the shot signature of the shot transition frame for determining the fingerprint of the video;
setting the first frame equal to the shot transition frame and setting the second frame either equal to a frame present after the first predefined number of frames from the first frame or if the first predefined number of frames is greater than the number of frames between the first frame and the last frame of the video then setting the second frame equal to the last frame of the video; and
repeating all the steps of the method till the second frame is equal to the last frame of the video;
else if the normalized histogram difference is greater than or equal to the first predefined threshold and the gap between the first frame and the second frame is greater than or equal to the second predefined threshold, then
determining a middle frame present sequentially in between the first frame and the second frame;
determining a first normalized histogram difference between a histogram of luminance values of the pixels of the middle frame and the histogram of luminance values of the pixels of the first frame;
determining a second normalized histogram difference between the histogram of luminance values of the pixels of the middle frame and the histogram of luminance values of the pixels of the second frame;
comparing the first normalized histogram difference with the second normalized histogram difference and if the first normalized histogram difference is greater than or equal to the second normalized histogram difference, then
repeating all the steps of the method for frames in between and including the first frame and the middle frame;
else if the first normalized histogram difference is lesser than the second normalized histogram difference, then
repeating all the steps of the method for frames in between and including the middle frame and the second frame.

11. The system as claimed in claim 10, wherein the video is either an uncompressed video or an intra coded video.

12. A method for generating a fingerprint of a video having a plurality of inter-coded frames, the method comprising the processor implemented steps of:
decoding one or more I-frames present in the video, wherein the one or more I-frames comprise of a first I-frame and a second I-frame;
determining a group of pictures lengths for a predefined number of group of pictures present in the video;
calculating histogram of luminance values of the pixels of the first I-frame and histogram of luminance values of the pixels of the second I-frame;
calculating a normalized histogram difference between the histogram of luminance values of the pixels of the first I-frame and histogram of luminance values of the pixels of the second I-frame;
comparing the normalized histogram difference between the histogram of luminance values of the pixels of the first I-frame and histogram of luminance values of the pixels of the second I-frame with a first predefined threshold, and
if the normalized histogram difference is greater than or equal to the first predefined threshold, then analyzing the one or more group of pictures lengths;
if all the one or more group of pictures lengths are of different sizes, then
determining a shot boundary for a predefined number of frames present at the end of the group of pictures comprising one or more P-frames and the second I-frame and if the shot boundary is detected then
setting a frame having shot boundary as a shot transition frame;
determining a shot signature based on the shot transition frame;
utilizing the shot signature of the shot transition frame for determining the fingerprint of the video;
setting first I-frame equal to the second I-frame and setting the second I-frame equal to a sequentially next I-frame present in the video; and
repeating all the steps of the method till the second I-frame is equal to last I-frame of the video;
else if all the one or more group of pictures lengths are of the same size, then
determining a shot boundary for each of the one or more group of pictures comprising the P-frames present between first I-frame and second I-frame, and the second I-frame and if the shot boundary is detected then
setting a frame having shot boundary as a shot transition frame;
determining a shot signature based on the shot transition frame;
utilizing the shot signature of the shot transition frame for determining the fingerprint of the video;
setting first I-frame equal to the second I-frame and setting the second I-frame equal to a sequentially next I-frame present in the video; and
repeating all the steps of the method till the second I-frame is equal to last I-frame of the video;
else if a predefined number of group of pictures lengths are of same size and the remaining group of pictures lengths in the video are of different sizes,
if gap between the I-frames is more than a first predefined number of frames, then
determining a shot boundary for a predefined number of frames present at the end of the group of pictures comprising the P-frames and the second I-frame and if the shot boundary is detected, then
setting a frame having shot boundary as a shot transition frame;
determining a shot signature based on the shot transition frame;
utilizing the shot signature of the shot transition frame for determining the fingerprint of the video;
setting first I-frame equal to the second I-frame and setting the second I-frame equal to a sequentially next I-frame present in the video; and
repeating all the steps of the method till the second I-frame is equal to last I-frame of the video;
else if gap between the I-frames is less than or equal to a first predefined number of frames, then
determining a shot boundary for each individual group of pictures comprising the P-frames present between first I-frame and second I-frame, and the second I-frame and if the shot boundary is detected then
setting a frame having shot boundary as a shot transition frame;
determining a shot signature based on the shot transition frame;
utilizing the shot signature of the shot transition frame for determining the fingerprint of the video;
setting first I-frame equal to the second I-frame and setting the second I-frame equal to a sequentially next I-frame present in the video; and
repeating all the steps of the method till the second I-frame is equal to last I-frame of the video.

13. The method as claimed in claim 10, wherein if the shot boundary is not determined, then
setting the first I-frame equal to the second I-frame and setting the second I-frame equal to a sequentially next I-frame present in the video, and
repeating all the steps of the method till the second I-frame is equal to last I-frame of the video.

14. The method as claimed in claim 10, wherein the step of detecting the shot boundary comprises of
determining histogram of luminance values of pixels of a current frame, histogram of luminance values of pixels of a frame previous to the current frame, wherein the current frame is determined based on sequentially traversing frames starting from P-frame present a predefined number of frames before the second I-frame and including the second I-frame;

determining a normalized histogram difference, wherein the normalized histogram difference is equal to the difference between the histogram of luminance values of pixels of the current frame and the histogram of luminance values of pixels of a previous frame;

comparing the normalized histogram difference with a third predefined threshold, and if the normalized histogram difference is greater than the third predefined threshold, then calculating a minimum block-wise sum of absolute difference, wherein the block-wise sum of absolute difference is calculated between the pixels of one or more blocks of the current frame and the pixels of one or more blocks of the previous frame within the neighborhood; and calculating a normalized summation of minimum block-wise sum of absolute difference for the current frame and comparing the normalized summation of minimum block-wise sum of absolute difference with a fourth predefined threshold, and if the normalized summation of minimum block-wise sum of absolute difference is greater than the fourth predefined threshold, then the shot boundary is detected at current frame.

15. The method as claimed in claim 10, wherein the step of determining the shot signature comprises of determining ordinal ranks, centroid of gradients' orientations, number of edge pixels, and hue values of predefined regions of the shot transition frame, shot duration, and shot start time.

16. The method as claimed in claim 10, wherein the fingerprint of the video comprises of a metadata of the video, a list of shot signatures, and one or more buckets generated to hash one or more shots in a database.

17. A system for generating a fingerprint of a video having a plurality of inter-coded frames, the system comprising:

a decoder for decoding at least the I-frames and P-frames present in the video; and a processor communicatively coupled with the decoder for receiving I-frames and P-frames present in the video from the decoder and configured for:

determining a group of pictures lengths for a predefined number of group of pictures present in the video;

calculating histogram of luminance values of the pixels of the first I-frame and histogram of luminance values of the pixels of the second I-frame;

calculating a normalized histogram difference between the histogram of luminance values of the pixels of the first I-frame and histogram of luminance values of the pixels of the second I-frame;

comparing the normalized histogram difference between the histogram of luminance values of the pixels of the first I-frame and histogram of luminance values of the pixels of the second I-frame with a first predefined threshold, and if the normalized histogram difference is greater than or equal to the first predefined threshold, then analyzing the one or more group of pictures lengths;

if all the one or more group of pictures lengths are of different sizes, then determining a shot boundary for a predefined number of frames present at the end of the group of pictures comprising one or more P-frames and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if all the one or more group of pictures lengths are of the same size, then determining a shot boundary for each of the one or more group of pictures comprising the P-frames present between first I-frame and second I-frame, and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if a predefined number of group of pictures lengths are of same size and the remaining group of pictures lengths in the video are of different sizes, if gap between the I-frames is more than a first predefined number of frames, then determining a shot boundary for a predefined number of frames present at the end of the group of pictures comprising the P-frames and the second I-frame and if the shot boundary is detected, then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if gap between the I-frames is less than or equal to a first predefined number of frames, then determining a shot boundary for each individual group of pictures comprising the P-frames present between first I-frame and second I-frame, and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video.

18. A computer program product for generating a fingerprint of a video having a plurality of inter-coded frames, the computer program product comprising a non-transitory computer-readable medium having instructions embodied thereon, which when executed by a processor causes the processor to implement a method, the method comprising:

decoding one or more I-frames present in the video, wherein the one or more I-frames comprise of a first I-frame and a second I-frame;

determining a group of pictures lengths for a predefined number of group of pictures present in the video;

calculating histogram of luminance values of the pixels of the first I-frame and histogram of luminance values of the pixels of the second I-frame;

calculating a normalized histogram difference between the histogram of luminance values of the pixels of the first I-frame and histogram of luminance values of the pixels of the second I-frame;

comparing the normalized histogram difference between the histogram of luminance values of the pixels of the first I-frame and histogram of luminance values of the pixels of the second I-frame with a first predefined threshold, and if the normalized histogram difference is greater than or equal to the first predefined threshold, then analyzing the one or more group of pictures lengths;

if all the one or more group of pictures lengths are of different sizes, then determining a shot boundary for a predefined number of frames present at the end of the group of pictures comprising one or more P-frames and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if all the one or more group of pictures lengths are of the same size, then determining a shot boundary for each of the one or more group of pictures comprising the P-frames present between first I-frame and second I-frame, and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if a predefined number of group of pictures lengths are of same size and the remaining group of pictures lengths in the video are of different sizes, if gap between the I-frames is more than a first predefined number of frames, then determining a shot boundary for a predefined number of frames present at the end of the group of pictures comprising the P-frames and the second I-frame and if the shot boundary is detected, then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video;

else if gap between the I-frames is less than or equal to a first predefined number of frames, then determining a shot boundary for each individual group of pictures comprising the P-frames present between first I-frame and second I-frame, and the second I-frame and if the shot boundary is detected then setting a frame having shot boundary as a shot transition frame;

determining a shot signature based on the shot transition frame;

utilizing the shot signature of the shot transition frame for determining the fingerprint of the video;

setting first I-frame equal to the second I-frame and setting the second I-frame equal to a sequentially next I-frame present in the video; and repeating all the steps of the method till the second I-frame is equal to last I-frame of the video.

\* \* \* \* \*